US007735538B2

(12) United States Patent
Ogawa

(10) Patent No.: US 7,735,538 B2
(45) Date of Patent: Jun. 15, 2010

(54) DOOR SHUTTER

(75) Inventor: Atsushi Ogawa, Utsunomiya (JP)

(73) Assignee: Nifco Inc., Yokohama-shi, Kanagawa (JP)

( * ) Notice: Subject to any disclaimer, the term of this patent is extended or adjusted under 35 U.S.C. 154(b) by 289 days.

(21) Appl. No.: 11/905,562

(22) Filed: Oct. 2, 2007

(65) Prior Publication Data

US 2008/0083517 A1 Apr. 10, 2008

Related U.S. Application Data

(60) Provisional application No. 60/849,805, filed on Oct. 6, 2006.

(51) Int. Cl.
*B60R 7/04* (2006.01)

(52) U.S. Cl. ..................... 160/230; 296/24.34; 312/297

(58) Field of Classification Search ................. 160/230, 160/231.1, 231.2; 312/297; 296/37.8, 24.34; 224/539
See application file for complete search history.

(56) References Cited

U.S. PATENT DOCUMENTS 6,478,204 B2 * 11/2002 Lange et al. ................ 224/539
6,499,785 B2 * 12/2002 Eguchi ...................... 296/37.8
6,672,554 B2 * 1/2004 Fukuo ..................... 248/311.2
6,883,852 B2 * 4/2005 Laskey ...................... 296/37.8
7,287,795 B1 * 10/2007 Thomas ................... 296/24.34
7,475,954 B1 * 1/2009 Latunski ..................... 312/297
7,540,391 B2 * 6/2009 Kato .......................... 220/252
7,581,773 B2 * 9/2009 Strasser et al. ............. 296/1.09
2007/0102463 A1 * 5/2007 Thomas ...................... 224/275

* cited by examiner

*Primary Examiner*—David Purol
(74) *Attorney, Agent, or Firm*—Manabu Kanesaka

(57) ABSTRACT

While a bending ability is maintained, it is possible to provide an outer appearance which is not made possible in the past. A door shutter includes a main body on a design surface side which is bent in a width direction through thin parts, and plural block pieces disposed between the thin parts on an underside of the main body, wherein an opening on a device side is opened or closed by sliding along a guide groove on the device side. On the main body, the thin parts are formed as a plane surface, and parts overlapping with the block pieces are formed in an upwardly convex curved shape.

6 Claims, 5 Drawing Sheets

DOOR SHUTTER

BACKGROUND OF THE INVENTION AND RELATED ART STATEMENT

The present invention relates to a bendable door shutter that is slid following a guide groove on a device side.

Among door shutters, there is one, as shown in Patent Document 1, having a main body on a design surface side which is bent via thin parts in the width direction, and plural block pieces (same as frame or core wood) disposed on the underside of that main body, for opening and closing a device opening by being slid following a guide groove having a curved part on the device side. Here, as the main body, a soft resin, or the like, is used in order to maintain bendability, the thin parts are formed at equal intervals, and each thin part and the parts between the thin parts are formed as a plane surface. As the block pieces, a hard resin, or the like, is used in order to give rigidity, and from the viewpoint of bendability, they are disposed integrally between the thin parts on the underside of the main body.

Patent Document 1: Japanese Unexamined Patent Publication No. 2003-90186

In the structure of the door shutter as above, in maintaining bendability, the design surface of the main body, that is, the part between the thin parts was limited to a plane surface. In other words, as the shutter, although it is preferable to make the design surface of the main body an upwardly convex curved shape, it was considered impossible in connection with that the bendability is impaired.

Therefore, the purpose of the present invention is to solve the problems such as above, and to make it such that a cosmetic shape hitherto considered impossible can be given while maintaining bendability.

SUMMARY OF THE INVENTION

In order to achieve the above purpose, the present invention is a door shutter, having a main body on a design surface side which is bent via thin parts in the width direction, and plural block pieces disposed between the thin parts on the underside of that main body, for opening and closing an opening on a device side by sliding along a guide groove on the device side, wherein on the main body, the thin parts are formed as a plane surface, and the parts overlapping with the block pieces are formed in an upwardly convex curved shape.

It is preferable that the structure of the above door shutter of the present invention be made concrete as follows:

(a) the block pieces are roughly inverted U shaped or T shaped in vertical section, and they project from the underside of the main body in a condition having the lower side not joined to that main body (second feature);

(b) the block pieces are integrally formed on the main body (third feature);

(c) the block pieces are formed with hard resin material, and the main body is formed with soft resin material (fourth feature).

In the invention of the first feature, as a shutter having a main body which is bent via thin parts in the width direction and plural block pieces disposed between the thin parts on the underside of that main body, by the fact that the main body is formed with the thin parts as a plane surface and the parts overlapping the block pieces in an upwardly convex curved shape, a novel cosmetic appearance can be given while maintaining bendability.

In the invention of the second feature, by the fact that the block pieces are made to project from the underside of the main body in a condition having the lower side not joined to the main body, the overall rigidity can be improved by making the block pieces larger without impairing the bendability. As opposed to this, in the inventions of third and four features, for example, the manufacturing expense can be reduced by the fact that the block pieces and the main body are integrally formed by two-material molding method, or the like. Also, the overall rigidity can be fulfilled by the block pieces made of hard resin, and the bending characteristic of the thin parts can be fulfilled by the main body made of soft resin.

DETAILED DESCRIPTION OF THE EMBODIMENTS

Figure 1:
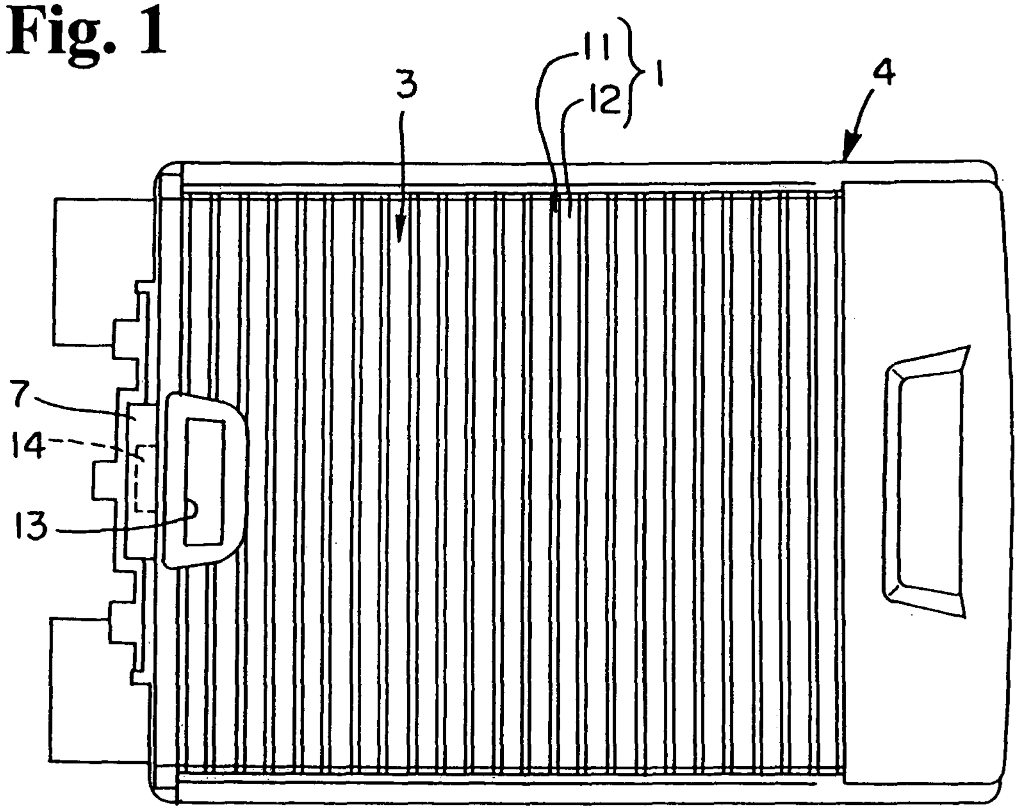
FIG. 1 is top view showing the state having closed the device opening with the shutter of a mode of the present invention.
Figure 2:
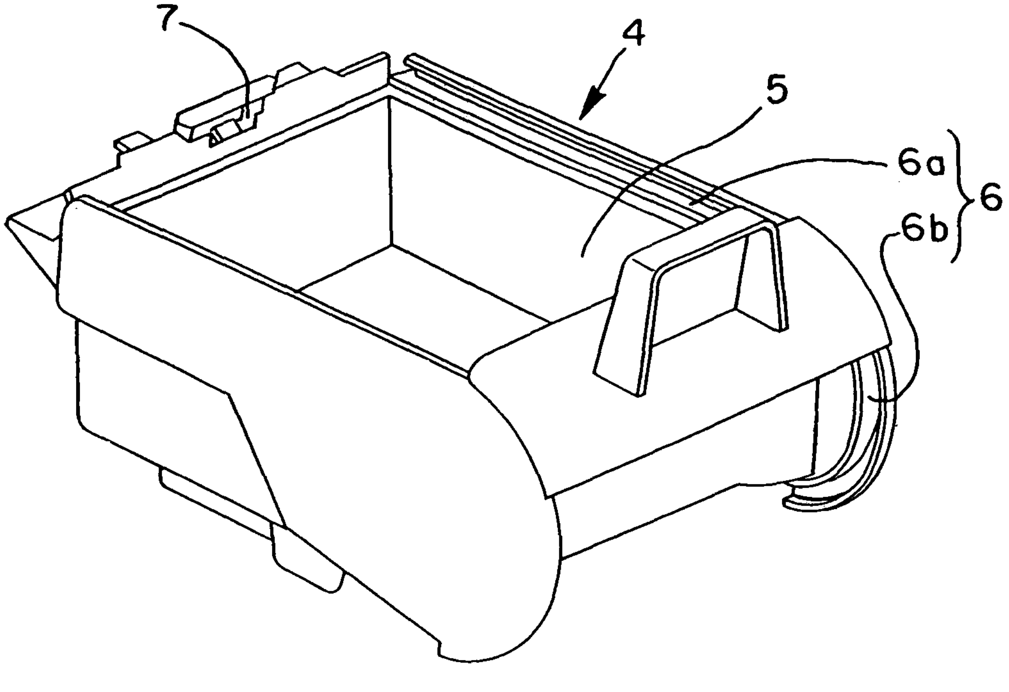
FIG. 2 is a generalized perspective view showing only the device of FIG. 1.

Below; examples of the present invention are explained while referring to the attached drawings. FIG. 1 to FIG. 5 show an example of a shutter having applied to the present invention and a device using that shutter, and FIG. 6 shows a modified example.

(Structure)

This shutter 3 has a main body 1 which is bent via plural thin parts 11 and has plural projections 15 formed on both side parts, and plural block pieces 2 disposed between the thin parts 11 on the underside of that main body 1, and it is disposed so as to slide freely on guide grooves 6 provided on both sides of a receiving part 5 of a device 4 to open and close the opening of the receiving part 5. This device 4 or receiving part 5 is provided in the center console of an automobile as disclosed in the Publication of Japanese Patent No. 3319202, and the guide groove 6 has a linear part 6*a* which extends front to back and a curved part 6*b*. Also, the shutter 3 becomes the closed state when it is slid in the direction of the linear part 6*a*, and it becomes the open state when it is slid in the direction of the curved part 6*b*. However, there is no trouble even if the use of the shutter 3 is other than this.

Here, the main body 1 is set in a length dimension corresponding to the opening of the receiving part 5, and it has plural thin parts 11 and parts 12 between the thin parts, as well as a handle part 13 provided as a recess in front on the leading end side, a coupling part 14 placed to project on the edge part of the leading end, and a large number of projections 15 provided on both sides.

Figure 4A:
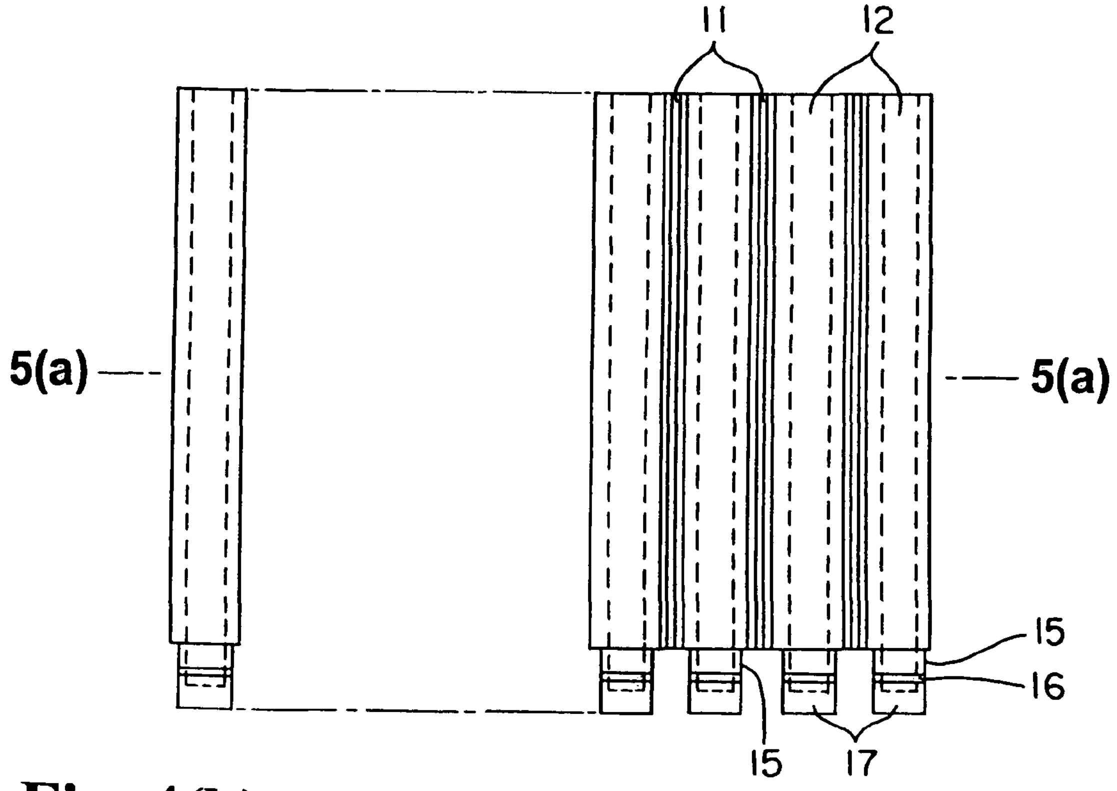
FIGS. 4(*a*) and 4(*b*) are parts of the above shutter, wherein FIG. 4(*a*) is a partial top view, and FIG. 4(*b*) is a partial bottom view.
Figure 4B:
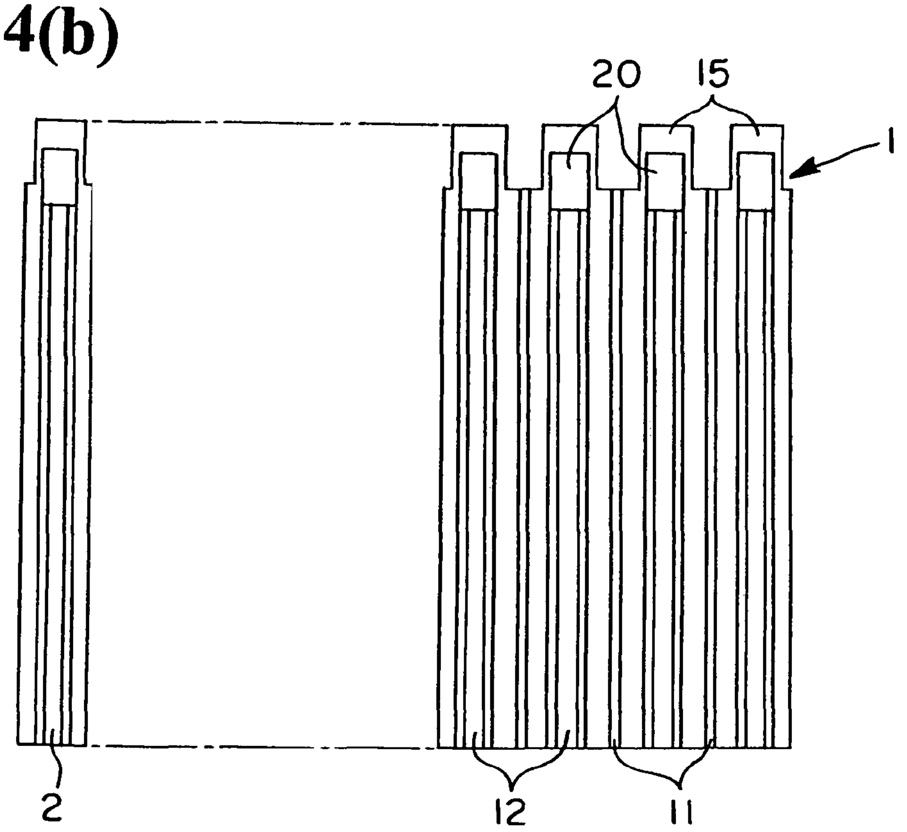
Figures 5A, 5B, 5C:
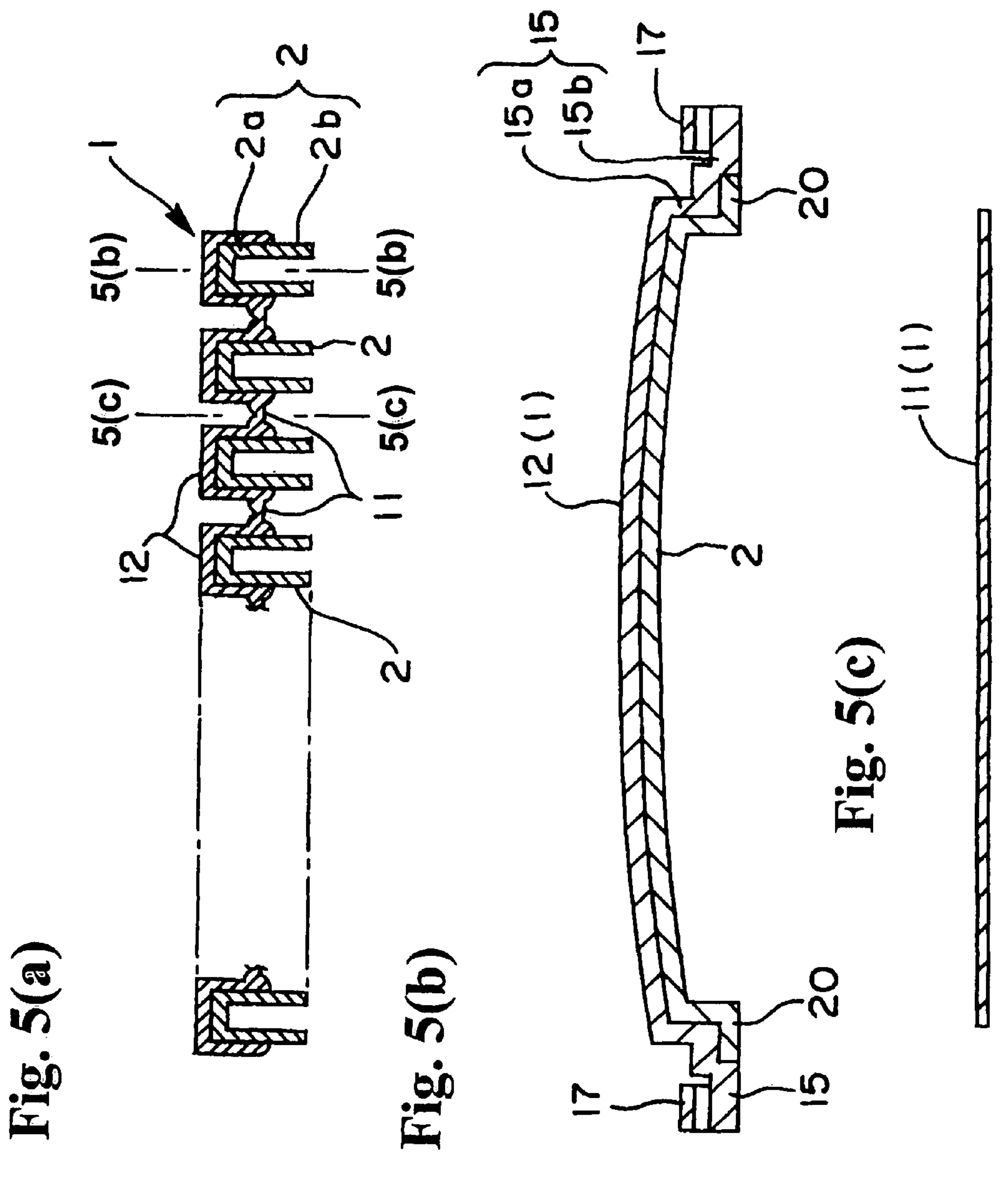
FIG. 5(*a*) is a sectional view taken along line 5(*a*)-5(*a*) in FIG. 4(*a*), FIG. 5(*b*) is a sectional view taken along line 5(*b*)-5(*b*) in FIG. 5(*a*), and FIG. 5(*c*) is a sectional view taken along line 5(*c*)-5(*c*) in FIG. 5(*a*).
Figure 6:
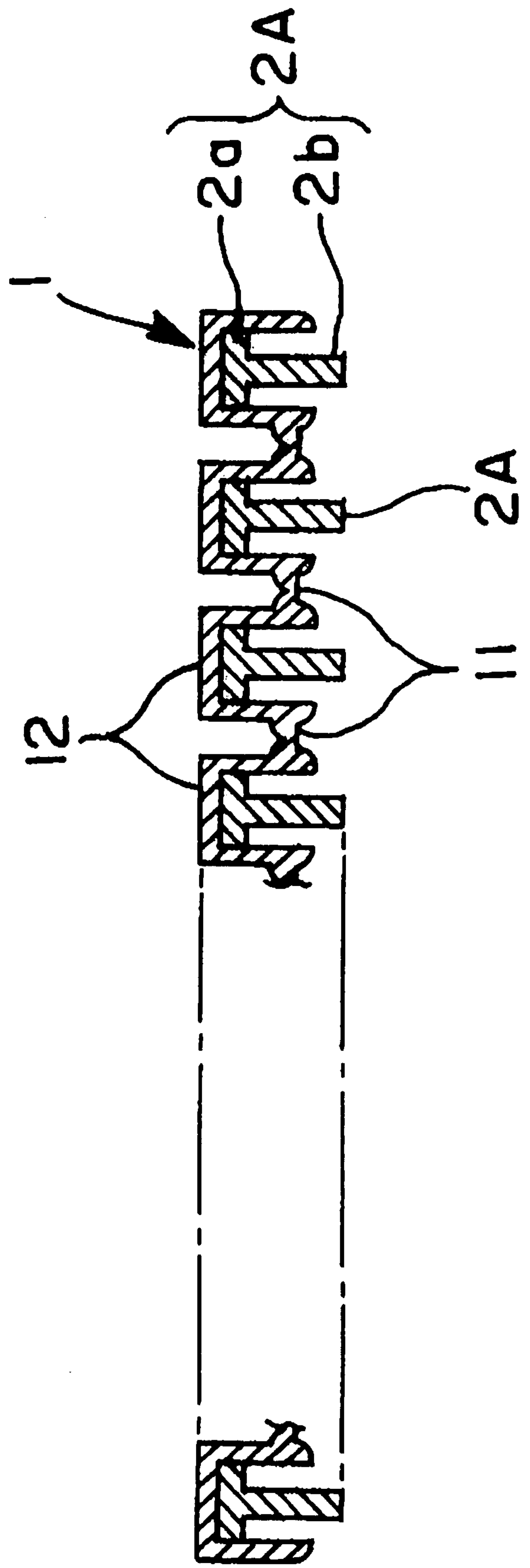
FIG. 6 is a drawing showing a modified example of the above shutter in correspondence with FIG. 5(*a*).

Of these, each thin part 11, as shown in FIGS. 4(*a*), 4(*b*) and FIGS. 5(*a*) and 5(*b*), extends in the width direction and is provided at equal intervals in the front-back direction, and its shape in the plate width or left-right direction is formed as a plane surface. The part 12 is a part overlapping the block piece 2, and the shape in the plate width or left-right direction is formed as an upwardly convex curved shape made to fit the block piece 2. The handle part 13 is used as a part for hooking the finger or hand when opening and closing the shutter 3. The coupling part 14 is a place for maintaining the closed state by entering into a catch recess 7 provided on the front side of the receiving part 5 when the shutter 3 is disposed in the closed state in FIG. 1 on the opening of the device side receiving part 5. However, this coupling part 14 also may be omitted.

Figure 3:
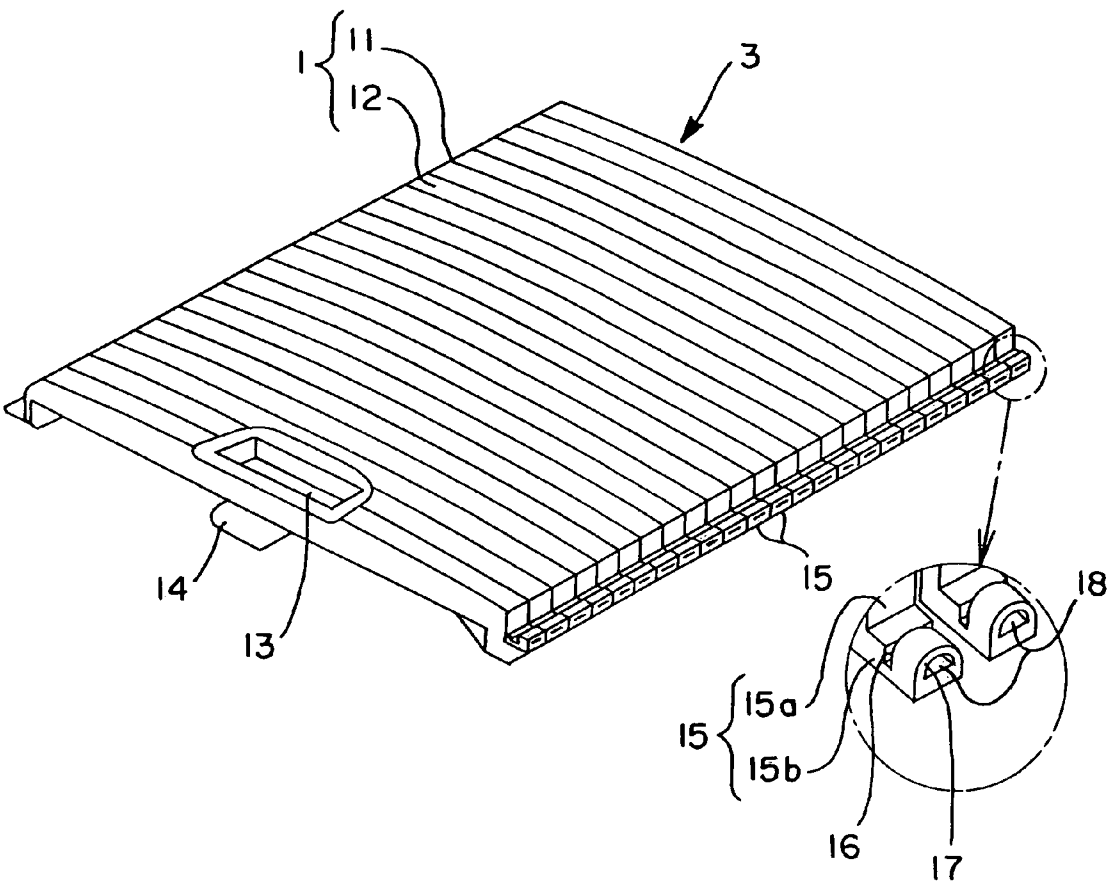
FIG. 3 is a generalized perspective view showing only the shutter of FIG. 1.

The projections 15 are provided between each thin part 11, that is, on each part 12, on both sides of the main body 1. Each projection 15, as shown in FIG. 3 and FIG. 5(*a*)-5(*c*), is roughly L shaped, and it is positioned beneath the main body 1 by an amount equivalent to the vertical part 15*a* of the L shape. On the horizontal part 15*b* of the L shape, there is provided a slot 16 running in the front-back direction, and the side forward from that slot 16 serves as a part for coupling with the guide groove 6. On this part, a dome-shaped small convex part 17 is provided on the terminal side of the horizontal part 15*b*. The small convex part 17 makes reduction of sliding resistance possible by elastic action via a hollow 18 inside it when the projection 15 slides following the guide groove 6.

As opposed to this, each block piece 2, as shown in FIGS. 4(*a*), 4(*b*) and FIG. 5(*a*)-5(*c*), is roughly inverted U shaped in vertical section, and it is integrated on the main body 1 in a condition having the upper side from the middle part joined and the lower side not joined. Therefore, each block piece 2, when viewed from the underside of the shutter 3, has the lower end part 2*b* made to project from the underside of the main body 1 in a condition having the area up to the near-middle part 2*a* of the inverted U shape buried in the part 12 between thin part 11 and thin part 11. Also, on both sides of the block piece 2, there is a small projection 20 which is smaller than the projection 15 as in FIG. 5(*b*), and that small projection 20 is made integrally on a part corresponding to the projection 15 on the main body 1.

The above shutter 3 is fabricated by two-material molding method. In this molding, in the first molding, the plural block pieces 2 are formed inside a mold using a hard resin material such as ABS (acrylonitrile-butadiene-styrene polymer) or polypropylene, and then it is second molded. In the second molding, the main body 1 comes to be formed using a soft resin material such as polyester elastomer or polypropylene elastomer. Therefore, in this shutter 3, the parts other than each block piece 2 which is the hard-resin part, the thin part 11, the part 12, the parts where the handle part 13 and the coupling part 14 are formed, the projections 15 on both sides, and the small convex parts 17 become the soft-resin parts formed with soft resin.

(Operation)

The above shutter 3 is incorporated into the device 4 in a state with each projection 15 coupled in the guide grooves 6 on both sides. In this state, as a shutter 3, because the part 12 of the main body 1 overlapping with the block piece 2 is formed as an upwardly convex shape, the design surface comes to have a novel cosmetic appearance exhibiting roundness. Also, as for the shutter 3, in the opening and closing operations, because the thin part 11 of the main body 1 is formed as a plane surface just as in the past, and moreover because the repelling force during bending deformation is absorbed by the dome shape being the hollow 18 of the small convex part 17, the bendability is kept good and it becomes capable of sliding without the curved part 6*b* of the guide groove 6 receiving unnecessary resistance.

MODIFIED EXAMPLE

FIG. 6 shows an example having changed the shape of the above block piece. This block piece 2A is roughly T shaped in vertical section, and it is integrated on the main body 1 in a condition having the horizontal part 2*a* joined and the vertical part 2*b* not joined. In this case as well, each block piece 2A, when viewed from the underside of the shutter 3, is made to project in a condition having the horizontal part 2*a* of the T shape buried in the part 12 between thin part 11 and thin part 11 of the main body 1 and in a condition having the vertical part 2*b* not joined with the main body 1. Thus the present invention can be modified variously except for the essential conditions specified in the claims. Also, it is optional concerning the use of the shutter 1, the shape of the device-side guide groove, and the like.

What is claimed is:

1. A door shutter for opening and closing an opening of a device with a guide groove, comprising:
   - a plurality of elongated block pieces arranged parallel to each other with a space therebetween, each of the block pieces having a top surface and two side surfaces, and
   - a main body forming a design surface and connecting the block pieces, said main body including top portions covering the top surfaces, side portions extending rearwardly from the top portions along the side surfaces to form elongated dents, each elongated dent extending rearwardly beyond the top surface of each block piece, connecting portions for connecting the side portions, each extending between two side portions, and thin parts formed at the connecting portions so that when the shutter is bent parallel to the block pieces, the shutter bends easily at the thin parts in the elongated dent.

2. The door shutter according to claim 1, wherein the thin part is formed in a middle of the connecting portion between the side portions while two sides of said connecting portion have a thickness greater than that of the thin part.

3. The door shutter according to claim 2, wherein each of the block pieces have an inverted U shape in vertical section, the main body extending along one block piece from one side surface to the other side surface through the top surface, and projects downwardly beyond the connecting portion.

4. The door shutter according to claim 2, wherein each of the block pieces have a T shape in vertical section and projects downwardly beyond the connecting portion.

5. The door shutter according to claim 1, wherein the block pieces are formed by hard resin material, and the main body is formed by soft resin material.

6. The door shutter according to claim 1, wherein the main body further comprises projections extending outwardly from the block pieces adapted to engage the guide groove, each projection having a dome-shaped convex part and a hollow inside the convex part.

* * * * *